F. A. HASENCLEVER.
Assignor, by direct and mesne assignments, to THE UPSON NUT COMPANY.
MANUFACTURE OF BLANKS FOR HEXAGONAL NUTS.
No. 10,788. Reissued Dec. 7, 1886.
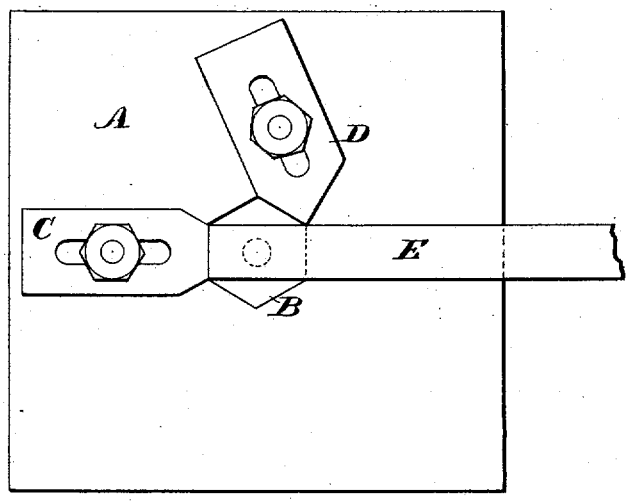
Witnesses.
John Edwards Jr.
W. H. Whiting.
Inventor.
Friedrich A. Hasenclever.
By James Shepard.
Atty.
N. PETERS, Photo-Lithographer, Washington, D. C.

UNITED STATES PATENT OFFICE.

FRIEDRICH ALBERT HASENCLEVER, OF DUSSELDORF, GERMANY, ASSIGNOR, BY DIRECT AND MESNE ASSIGNMENTS, TO THE UPSON NUT COMPANY, OF UNIONVILLE, CONNECTICUT.

MANUFACTURE OF BLANKS FOR HEXAGONAL NUTS.

SPECIFICATION forming part of Reissued Letters Patent No. 10,788, dated December 7, 1886.

Original No. 306,611, dated October 14, 1884. Application for reissue filed October 13, 1886. Serial No. 216,184. Patented in Germany October 21, 1881, No. 21,528.

*To all whom it may concern:*

Be it known that I, FRIEDRICH ALBERT HASENCLEVER, a citizen of the United States, residing at Dusseldorf, in the Empire of Germany, have invented a new and useful Improvement in the Manufacture of Blanks for Hexagonal Nuts, (for which I have obtained a patent in Germany, dated October 21, 1881, No. 21,528,) of which the following is a specification.

In machines for forging the blanks that have to be lapped, so as to form nuts for screw-bolts, the piece of metal that is to constitute the blank is usually cut by a punch off the end of a bar and forced into a matrix, in which it is punched with a round hole, compressed, and shaped to the form of the matrix. When the nuts are to be hexagonal, there is considerable waste of metal in cutting them from a straight rectangular bar, as angular pieces of the metal have to be removed in order to bring the blank to the hexagonal shape. Attempts have been made to avoid this waste by indenting the edges of the bar, so that it presents hollows between the successive hexagons; but it has been found difficult to make the bar thus indented gage accurately with the spacing determined by the matrix.

My invention relates to a method of presenting the bar to the cutting-punch and matrix and determining its position when cut in such a manner that there is no waste of metal and no difficulty in setting it to proper gage, as I will explain, referring to the accompanying drawing, which shows a hexagonal matrix with the bar placed over it against the gages, by which its position is determined.

On the block A, which contains the hexagonal matrix B, are fixed two gages, the flat end gage, C, against which the end of the bar is pressed, and the pointed side gage, D, against which the side of the bar is pressed. Each of these gages is secured to the block A by a bolt or screw passing through a slotted hole. The gage C is set so that its face coincides with one of the sides of the hexagon. The gage D is set so that one of its sloping sides coincides with a side of the hexagon, its point being at the adjacent angle of the hexagon. The bar E is selected of breadth equal to the length of a side of the hexagon, and of such depth as to give metal enough to fill out the hexagon to the depth of the required blank. The bar being placed against the gages, as shown, the punch cuts from its end a rectangular piece without any waste, and this piece, when forced down in the matrix against the opposite bolster and punched through with a round hole, is spread out, molded, and compressed, so as to take the shape of the matrix.

It will be seen that in my invention a metal bar of rectangular form is first employed, having the width of its face equal to the side of the hexagon, and having a depth or thickness sufficient to fill up the die, when it is centrally punched and compressed in the die, whereby rectangular pieces can be cut from the bar with no waste of metal, and requiring but little cutting to sever them from the bar. This has been found of great advantage and usefulness, in that I avoid first imparting to the metal bar a peculiar shape—such as indenting the sides, as heretofore stated—while I avoid waste of metal throughout the operation.

I am aware that nuts have been cut from variously-shaped metal bars—as, for example, in Patent No. 180,285, where a bar is produced the cross-section of which is a polygon of the form of the nut to be produced, the nut-blanks of the requisite length being cut off and fed to a closed die-box to punch the eye and compact the nut.

I am also aware that a heated bar from which blanks have to be made has been adjusted against a stop-block on a die-box, a die moving forward to sever a portion of the bar and force the severed piece into the die and against a counter-die and punch to centrally indent the blank, after which the nut is removed and in a cold condition subjected to an ordinary punching-machine, the punch of which has a larger diameter than the aforesaid indentation to complete and shave the eye, as in Patent No. 97,901. Such, however, do not constitute my invention, and are not claimed.

Having thus described the nature of my in-vention and the best means I know of carrying it into practical operation, I claim—

The method herein described of making hexagonal nuts, which consists in first providing a rectangular bar of metal having the width of its face equal to the side of the hexagon, and having a depth or thickness sufficient to fill up a hexagonal die when compressed and spread, then presenting the end and side of the bar against gages over the die, severing a rectangular piece from the bar, and finally forcing the said piece into the die and punching the complete eye, and uniformly spreading the metal to fill the die, substantially as set forth.

In testimony whereof I have signed my name to this specification, in the presence of two subscribing witnesses, this 29th day of September, 1886.

FRIEDRICH ALBERT HASENCLEVER.

Witnesses:
THEODOR I'ESLER,
CARL ROBERT SCHAARWÄCHTER.